Aug. 9, 1949.　　L. A. GIVENS　　2,478,819

MOLD FOR BUTTER AND SIMILAR SUBSTANCES

Filed Dec. 16, 1946

INVENTOR
LYNN A. GIVENS

ATTORNEYS

Patented Aug. 9, 1949

2,478,819

UNITED STATES PATENT OFFICE 2,478,819

MOLD FOR BUTTER AND SIMILAR SUBSTANCES

Lynn A. Givens, Columbus, Ohio

Application December 16, 1946, Serial No. 716,445

2 Claims. (Cl. 31—44)

Many families buy their butter or oleomargarine in bulk form but fastidious house wives enjoy butter or oleomargarine in the form of a rectangular parallelepiped stick preferably square in transverse cross section and from which members of the family can each cut at will such fraction as may be needed.

The object of the present invention is to provide a molding device for butter or eleomargarine especially for family use, whereby the butter or oleomargarine can be easily and rapidly reduced to sticks of attractive form.

In the accompanying drawing

In the views the character 5 designates the side walls of the mold body, said walls standing at right angles to the bottom 6. The bottom 6 is shown as having an extension 6ª at each end thereof.

The character 7 designates a shaper and stick ejection member the operation of which is to flatten or form the top of the material being molded. The said shaper and ejecter member has at one end a projection 8 that fits on the bottom and inner sides of the stick receptacle and former.

Figure 3:
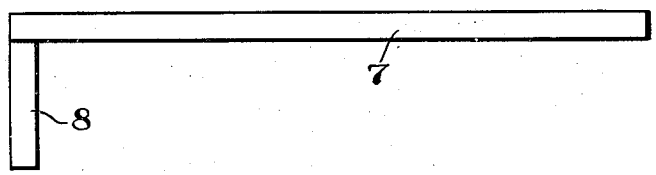
Fig. 3 is a view in side elevation of the device for shaping the top surface of the butter in mold device as shown in Figs. 1 and 2.
Figure 4:
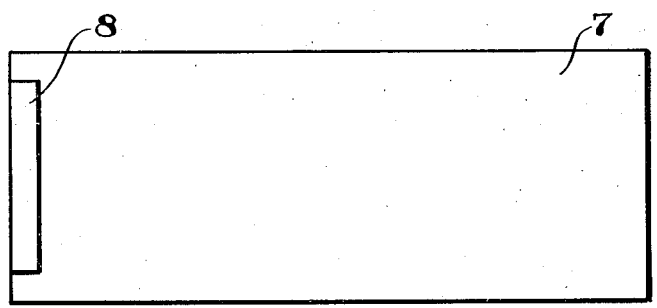
Fig. 4 is a plan view of the lower side of the shaping and stick ejecting member shown in Fig. 3.
Figure 2:
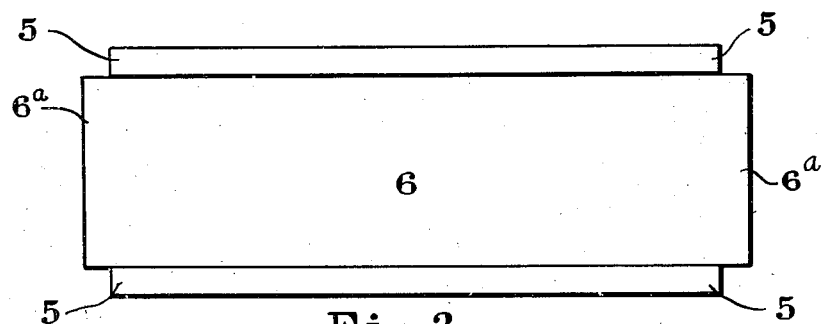
Fig. 2 is a top plan view of the structure shown in Fig. 1.
Figure 1:
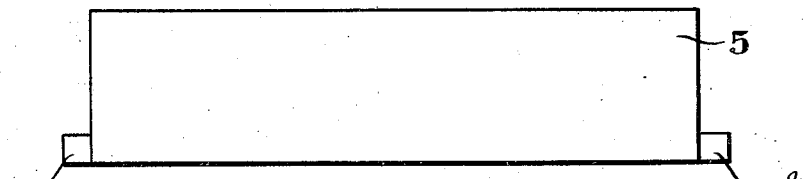
Fig. 1 illustrates in side view the body of the mold.

In making a stick of butter or oleomargarine the former as shown in Figs. 1 and 2 is filled with the material between walls 5 and then the shaper-injector member shown in Figs. 3 and 4 applied to the upper surface of the content to a level with the upper edges of the walls 5 and pushed to shape and eject the stick of material. The projections 6ª serve as seats in properly placing the ejector 7—8 on the contents of the molding member 5—6.

The form and dimensions of the parts can be changed without departing from the gist of the invention as claimed.

What I claim is:

1. An ejector type mold for butter, oleomargarine, or the like, comprising a bottom wall and two side walls forming a rectangular receptacle open at the top and at both ends, and a removable top member forming a pressure element, said top member provided with a downwardly projecting plate adapted snugly to fit within said side walls and movable therein to eject a stick of the molded material.

2. An ejector type mold for butter, oleomargarine, or the like, comprising a bottom wall and vertical side walls forming a rectangular receptacle open at the top and at both ends, and a movable top member forming a pressure element, said top member provided with an ejector plate projecting downwardly from its end and adapted snugly to fit within said side walls, said bottom wall extending beyond the side walls to form a seat and gauge for the ejector member.

LYNN A. GIVENS.

REFERENCES CITED

The following references are of record in the file of this patent:

UNITED STATES PATENTS

| Number | Name | Date |
|--------|------|------|
| 657,610 | Mitchell | Sept. 11, 1900 |
| 1,041,033 | Crist | Oct. 15, 1912 |
| 2,147,684 | Weinberg | Feb. 21, 1939 |
| 2,266,844 | Bouchard | Dec. 23, 1941 |